(12) United States Patent
Shimura

(10) Patent No.: US 6,788,192 B2
(45) Date of Patent: Sep. 7, 2004

(54) TRANSPONDER FOR TIRE, TIRE WITH TRANSPONDER AND MANUFACTURING METHOD OF TIRE WITH TRANSPONDER

(75) Inventor: Kazuhiro Shimura, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 217 days.

(21) Appl. No.: 10/033,984

(22) Filed: Jan. 3, 2002

(65) Prior Publication Data

US 2002/0093422 A1 Jul. 18, 2002

(30) Foreign Application Priority Data

Jan. 12, 2001 (JP) ........................................ 2001-005436

(51) Int. Cl.$^7$ .............................................. B60C 23/00
(52) U.S. Cl. ...................... 340/447; 340/442; 73/146.4; 152/152.1
(58) Field of Search ................................ 340/442, 443, 340/444, 445, 446, 447, 448; 73/146.4, 146.5; 116/34 R, 34 B; 152/152.1

(56) References Cited

U.S. PATENT DOCUMENTS

| | | | | |
|---|---|---|---|---|
| 4,911,217 A | * | 3/1990 | Dunn et al. | 152/152.1 |
| 5,573,611 A | * | 11/1996 | Koch et al. | 152/152.1 |
| 6,062,283 A | * | 5/2000 | Watanabe et al. | 152/510 |
| 6,208,244 B1 | * | 3/2001 | Wilson et al. | 340/447 |
| 6,688,353 B1 | * | 2/2004 | Koch | 152/152.1 |

OTHER PUBLICATIONS

Abstract of Japanese Patent Publication No. 11-278021; dated Oct. 12, 1999.
Abstract of Japanese Patent Publication No. 05-169931; dated Jul. 9, 1993.

* cited by examiner

Primary Examiner—Anh V. La
(74) Attorney, Agent, or Firm—Rader, Fishman & Grauer PLLC

(57) ABSTRACT

To provide a transponder for tire, in which the physical quantity in an atmosphere within a tire air chamber can be accurately detected by a sensor and which can be vulcanized in a state in which it is embedded in the tire, a tire with the transponder, and a manufacturing method of the tire. According to the present invention, a transponder obtained by hermetically sealing, by a housing, a circuit substrate with the sensor and other electronic components packaged is embedded between an inner liner and a carcass ply. A green tire thus embedded is vulcanized, and after the vulcanization, the tip end portion of a protruded portion of the housing is removed together with part of the tire inner wall surface, and an aperture is formed at a tip end of the protruded portion to communicate an interior of the tire air chamber with the sensor within the housing. Since a circuit substrate is hermetically sealed and housed within the housing, there is no possibility that pressure during vulcanization is applied to the sensor. Thereby, the sensor and the electronic components are protected against deterioration and destruction due to the pressure during vulcanization.

33 Claims, 9 Drawing Sheets

TRANSPONDER FOR TIRE, TIRE WITH TRANSPONDER AND MANUFACTURING METHOD OF TIRE WITH TRANSPONDER

BACKGROUND OF THE INVENTION

1. Field of the Invention

The present invention relates to a transponder for tire, a tire with a transponder and a mounting method of the tire with transponder, and more particularly to embedding, into the tire, of the transponder equipped with a sensor for detecting physical quantity in the atmosphere within the tire air chamber.

2. Description of the Related Art

Conventionally, when identification information concerning the tire and other additional information are acquired or information on pneumatic pressure, temperature or the like in the atmosphere within the tire air chamber is acquired, there is known a method of fitting a transponder within the tire to acquire the information without making contact with the tire. Also, the transponder is composed of an integrated circuit and a housing for protecting the integrated circuit, and has various shapes such as a small coin shape or a cylindrical column shape.

An example of technique of this sort is disclosed in Japanese Patent Laid-Open No. 5-169931 specification (first conventional example). According to this technique, an entire housing for the transponder is completely embedded within the tire such that a coil antenna of the transponder having a pressure sensor can be combined with bead wire of the tire. Further, the bead wire is used as the primary winding and the coil antenna is used as the secondary winding. Thereby, the pneumatic pressure within the tire air chamber is detected through the inner wall of the tire, and this detection result is transmitted by wireless.

Also, as another example, a tire with transponder has been disclosed in Japanese Patent Laid-Open No. 11-278021 specification (second conventional example). This tire is provided with fitting structure for fitting the transponder to the inner liner, and after tire vulcanization, the transponder is fitted to the fitting structure.

However, the above described tire with transponder according to the conventional example had the following problems. That is, in the first conventional example, since the pneumatic pressure within the tire air chamber has been detected through the inner wall of the tire, it was necessary to adjust the pressure sensor after the transponder is fitted to the tire. Further, on the inner wall of the tire, pressure or the like which occur by deformation of the inner wall during traveling are also added in addition to the pneumatic pressure within the tire air chamber, and the pressure within the tire air chamber is diffused in the inner wall. Therefore, it was difficult to detect accurate pneumatic pressure within the air chamber.

Also, in the second conventional example, since the transponder is fitted to the fitting structure provided for the inner liner, communication with the interior of the tire air chamber can be secured even if the transponder is provided with a sensor. In the case, however, where the transponder is caused to store tire identification information or other additional information concerning the tire and is made possible to read out, the reliability of the information stored in the transponder is exceedingly low because the transponder can be easily replaced. In other words, it is possible to easily replace with a transponder fitted to another tire, and this is unsuitable structure when information on individual tires is caused to be stored.

Also, there has also been known a transponder constructed such that a communicating tube extending from within the tire air chamber to the outside of the air chamber is provided to couple to the sensor, but since the communicating tube having high strength is required, there was a problem that the weight is increased.

SUMMARY OF THE INVENTION

The present invention has been achieved in views of the above described problems, and is aimed to provide a transponder for tire, in which the physical quantity in the atmosphere within the tire air chamber can be accurately detected by a sensor and which can be vulcanized in a state in which it is embedded within the tire, a tire with the transponder, and a manufacturing method of the tire.

According to a manufacturing method of a tire with transponder of the present invention, in order to attain the above described object, there is used a transponder obtained by hermetically sealing and housing a sensor and wireless communication means which constitute an electrical circuit for the transponder, in the space within the housing. This transponder is embedded in the inner wall of a green tire before vulcanization and the green tire is vulcanized. Further, after the vulcanization, a portion of the transponder housing is removed together with a portion of the inner wall surface of the tire to thereby cause the interior of the tire air chamber and space within the transponder housing to communicate with each other.

According to the manufacturing method of a tire with transponder of the present invention, when the green tire with the transponder embedded therein is vulcanized, heat during the vulcanization is applied to the sensor and the wireless communication means through the housing, but the pressure during the vulcanization is interrupted by the housing because the sensor and the wireless communication means are hermetically sealed and housed with in the housing. For this reason, there is no possibility that the pressure during the vulcanization is applied to the sensor and the wireless communication means. Thus, the sensor and the wireless communication means are protected against deterioration and destruction due to the pressure during the vulcanization.

After the green tire is vulcanized, a portion of the transponder housing is removed together with a portion of the inner wall surface of the tire to thereby cause the interior of the tire air chamber and space within the transponder housing to communicate with each other. Thus, since the atmosphere within the tire air chamber enters space within the transponder housing, the sensor within the housing is capable of sensing physical quantity in this atmosphere.

Also, in a process for embedding the transponder, the transponder housing is embedded between the tire inner liner and the carcass ply, whereby the interior of the tire air chamber and space within the transponder housing will be communicated with each other if a portion of the transponder housing is removed together with a portion of the tire inner liner. At this time, a member having light permeability is used as the tire inner liner and the transponder is embedded between the tire inner liner and the carcass ply, whereby the embedded position of the transponder can be easily specified after the vulcanization. Thus, the operation for communicating the space within the transponder housing with the interior of the tire air chamber can be easily performed.

In the process for embedding the transponder, a seat member can be stuck on the tire inner liner so as to cover the transponder housing with the seat member for embedding the transponder on the inner wall of the green tire. Also at this time, a seat member having light permeability is similarly used, whereby the embedded position of the transponder can be easily specified after the vulcanization. Also, by using a seat member having color different from that of the tire inner liner, the embedded position of the transponder can be easily specified after the vulcanization.

In the process for embedding the transponder, the transponder is embedded such that a portion targeted for removal of the transponoder housing is located inside the tire air chamber, whereby an operation for communicating the space within the transponder housing with the interior of the tire air chamber can be further easily performed.

Also, in the present invention, a transponder for tire suitable for the above described manufacturing method of the present invention has been constructed. The transponder for tire according to the present invention has a housing for hermetically sealing and housing the sensor and the wireless communication means. Further, the transponder housing has a portion targeted for removal at a predetermined position, and has space for communicating with a physical quantity sensing unit of the sensor inside the portion targeted for removal.

In the transponder for tire according to the present invention, since the sensor and the wireless communication means are hermetically sealed and housed within the housing, heat during the vulcanization is applied to the sensor and the wireless communication means through the housing, but the pressure during the vulcanization is interrupted by the housing. For this reason, there is no possibility that the pressure during the vulcanization is applied to the sensor and the wireless communication means. Thus, the sensor and the wireless communication means are protected against deterioration and destruction due to the pressure during the vulcanization. Also, after the termination of the vulcanization, the portion targeted for removal of the housing is removed from the tire inner wall side together with the tire inner wall by means of machining, cutting or the like, whereby the space within the housing for communicating with the physical quantity sensing unit of the sensor communicates with the interior of the tire air chamber. Thus, the atmosphere within the tire air chamber enters space within the housing, and physical quantity in this atmosphere the sensor is sensed by the physical quantity sensing unit of the sensor. For example, a pneumatic sensor is proved as a sensor, whereby the pneumatic pressure within the tire air chamber is sensed and this pneumatic pressure information can be transmitted to the main device by wireless communication using an electromagnetic wave or the like.

In the present invention, a semiconductor piezo-resistance type diaphragm is used as a pneumatic sensor, whereby a high degree of reliability has been obtained. More specifically, since such a semiconductor pressure sensor has small mechanical movement of the pressure sensing unit, it is difficult to be affected by a centrifugal force that occurs during rotation of the tire, and accurate pneumatic pressure can be detected. Further, for the semiconductor diaphragm, a capacity type and a film type are generally known in addition to the piezo-resistance type, but the capacity type diaphragm is prone to be affected by electromagnetic wave noise, and the film type diaphragm is hardly reliable because complicated in structure. The semiconductor piezo-resistance type diaphragm is more highly reliable than these capacity type and film type.

In the present invention, the transponder housing has been shaped to have a protruded portion for protruding from the main body of the housing. Further, in this housing, the space within the housing is continuously formed within the protruded portion. If the protruded portion of the housing is embedded in the inner wall of the tire so as to be able to be identified or easily removed, the whole protruded portion or a portion thereof is removed together with a portion of the inner wall from the inner wall side of the tire, whereby the space within the housing can be easily communicated with the interior of the tire air chamber.

Also, in the transponder according to the present invention, the wireless communication means is isolated from space within the housing which is communicated with the interior of the tire air chamber so as to prevent the atmosphere within the tire air chamber from being directly applied to the wireless communication means, whereby the wireless communication means has been prevented from being deteriorated. Further, in the present invention, the transponder housing is made of bisphenol A epoxy resin, whereby strength withstanding the vulcanization has been given. Also, since an electromagnetic wave permeates the bisphenol A epoxy resin, the electromagnetic wave can be restrained from attenuation even if the transponder is equipped with wireless communication means which communicates through the electromagnetic wave.

Also, the transponder for tire according to the present invention has storage means in which identification information peculiar to individual transponders has been stored, and transmits an answering signal including identification information. For this reason, the individual transponders can be identified through the use of the identification information. Further, in the present invention, there has been constructed a transponder for tire in which the additional information is caused to be stored in the storage means in advance in addition to the identification information and which transmits an answering signal including the identification information and additional information. For this reason, as the additional information, information concerning the transponder and information concerning a tire to which the transponder has been fitted are caused to be stored in the storage means in advance, whereby this additional information can be held by the tire itself. Further, according to the present invention, the structure has been arranged such that the additional information can be renewed from the main device by wireless.

As regards a tire with transponder according to the present invention which has been manufactured in accordance with the manufacturing method of the present invention through the use of the above described transponder for tire of the present invention, since the transponder housing is embedded in a green tire before vulcanization, it becomes impossible to take the transponder out of the completed tire after the vulcanization leaving no traces. In other words, in order to replace the transponder, the transponder housing must be dug out of the tire inner wall. For this reason, when the transporter embedded in the tire inner wall is replaced, the traces of this replacement operation can be easily recognized by visual inspection and the traces of the replacement remain clearly. This enables the reliability of information such as history of the tire stored in the transponder to be increased. Further, the interior of the tire air chamber and the physical quantity sensing unit of the sensor communicate with each other through the aperture of the transponder housing, and therefore, the sensor is capable of directly sensing the physical quantity in the atmosphere within the tire air chamber, and detecting accurate physical quantity.

DESCRIPTION OF THE PREFERRED EMBODIMENTS

Hereinafter, with reference to the drawings, the description will be made of an embodiment according to the present invention.

Figure 1:
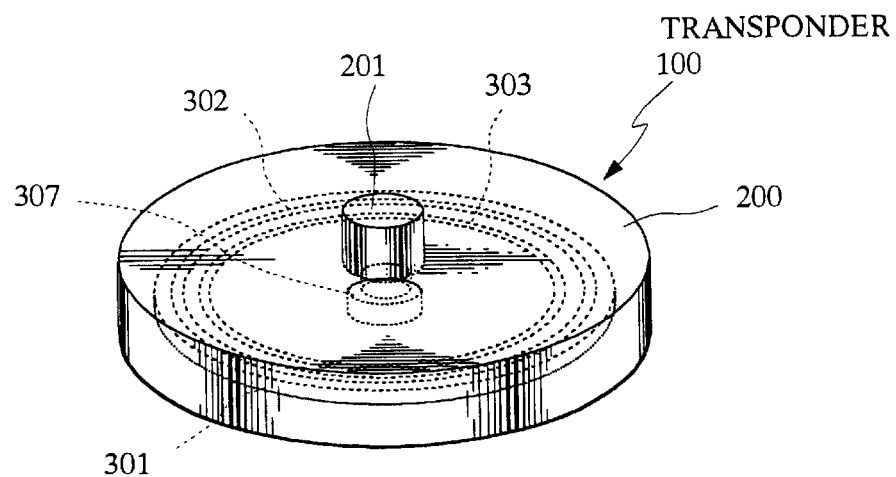
FIG. 1 is an external view showing a transponder according to a first embodiment of the present invention.
Figure 2:
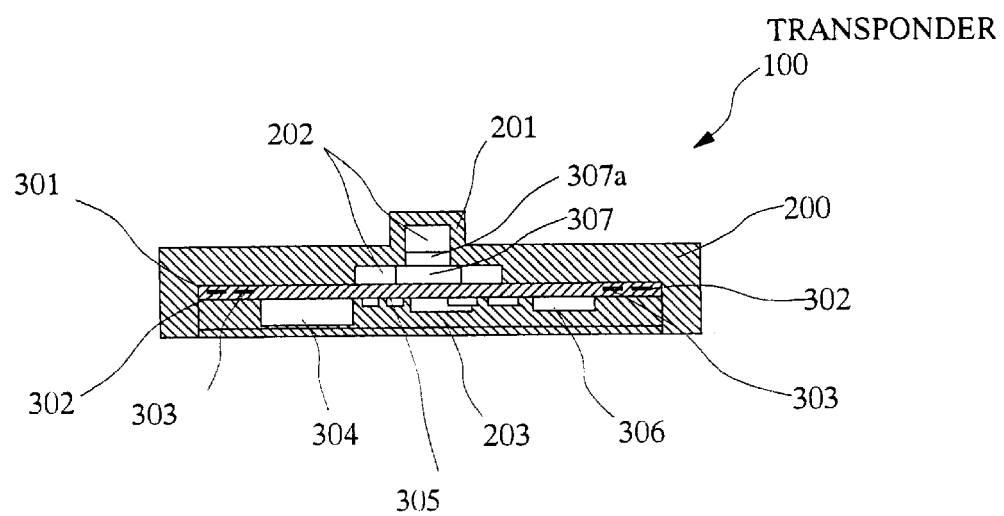
FIG. 2 is a side sectional view showing the transponder according to the first embodiment of the present invention.
Figure 3:
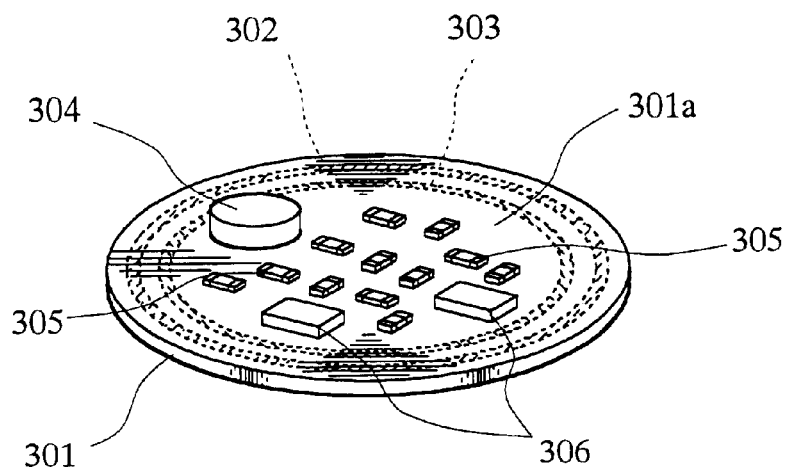
FIG. 3 is a perspective view showing one surface of a circuit substrate of the transponder according to the first embodiment of the present invention.
Figure 4:
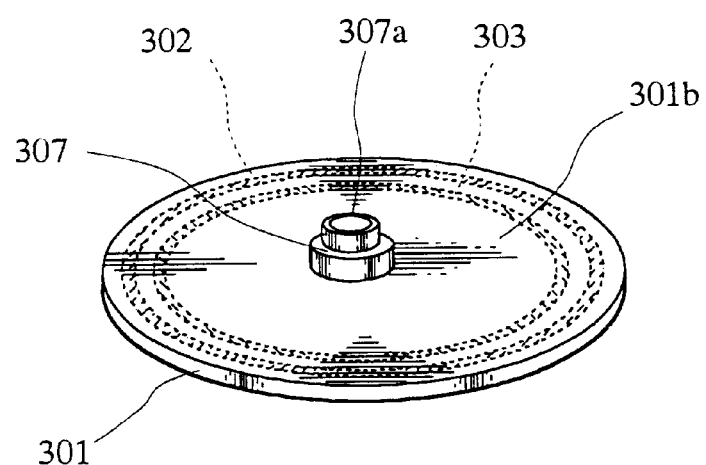
FIG. 4 is a perspective view showing the other surface of the circuit substrate of the transponder according to the first embodiment of the present invention.

FIG. 1 is an external perspective view showing a transponder for a tire according to a first embodiment of the present invention, FIG. 2 is its side sectional view, FIG. 3 is a perspective view showing one surface of its circuit substrate, and FIG. 4 is a perspective view showing the other surface of the circuit substrate. In these views, reference numeral 100 denotes a transponder for a tire (hereinafter, simply referred to as transponder). The transponder 100 has a substantially disk-shaped housing 200, and within the housing 200, there is arranged a disk-shaped multi-layer printed circuit substrate (hereinafter, simply referred to as circuit substrate) 301 packaged with components. Also, at a substantially central portion of one circular surface of the housing 200, there is formed a cylindrical column-shaped protruded portion 201, and predetermined space 202 is formed from the interior of the protruded portion 201 over the interior of the housing 200. This housing 200 is made of, for example, bisphenol A-type epoxy resin. In this respect, the protruded portion 201 is formed with no aperture. Also, the material for the housing 200 is not limited to the bisphenol A-type epoxy resin, but may be of other kinds so long as they are not deformed by means of heat when a green tire is vulcanized that will be described later. In the present embodiment, however, the material must be material for allowing the electromagnetic wave to pass through.

The circuit substrate 301 has a circular loop-shaped data transmission-reception antenna 302 and a charging antenna 303 which have been embedded in the inner layer thereof. Further, on the surface 301a of the circuit substrate 301, a capacitor 304, a plurality of chip-shaped electronic components 305 and an IC chip 306 are packaged. Also, on the back surface 301b of the circuit substrate 301, a cylindrical column chip-shaped pneumatic pressure sensor 307 is packaged. A sensing unit 307a of the pneumatic pressure sensor 307 is fitted in an entrance of the space 202 within the protruded portion 201.

Also, the circuit substrate 301 packaged with components is, with the exception of the packaged portion of the pneumatic pressure sensor 307, sealed with resin 203 in a state in which the back surface 301b is brought into tight contact with the inner wall surface of the housing 200. This causes the circuit substrate 301 packaged with components to be hermetically sealed by the housing 200 and the resin 203. A transmission-reception unit (wireless communication means) to be described later, of the transponder 100 is isolated from the space 202. Thus, when the housing 200 is formed with an aperture 201a, there is no possibility that the atmosphere within the tire air chamber is directly applied to any other electronic components than the pneumatic pressure sensor 307. In this respect, in place of the resin 203, material of another kind may be used so long as it is not deformed by means of heat during the vulcanization of green tire as in the case of the material of the housing 200.

In this case, in the present embodiment, a semiconductor piezo-resistance type diaphragm is used as the pneumatic pressure sensor 307. Since the semiconductor pressure sensor has small mechanical movement of the pressure sensing unit, it is difficult to be affected by a centrifugal force that occurs during rotation of the tire, and accurate pneumatic pressure can be detected. Also, for semiconductor diaphragm of this type, a capacity type and a film type are generally known in addition to the piezo-resistance type, but the capacity type diaphragm is prone to be affected by electromagnetic wave noise, and a film type diaphragm is hardly reliable. The semiconductor piezo-resistance type diaphragm is more highly reliable than these.

Also, even in a semiconductor piezo-resistance type diaphragm which is currently on the market, the operation thereof is sufficiently insured even if the temperature (for example, temperature of 150 degrees) during the vulcanization of the tire is applied for 45 minutes. In the case, however, where the semiconductor piezo-resistance type diaphragm which is currently on the market is of a diffused resistor type, when high pressure is applied at high temperature, creeping occurs on the diaphragm portion. For this reason, a sensor output value that has been proofread in the transponder manufacturing process in advance may be greatly changed. Therefore, during the vulcanization of the tire, high pressure cannot be directly applied to the semiconductor piezo-resistance type diaphragm. For this reason, in the present embodiment, the circuit substrate 301 packaged with components is hermetically sealed by the housing 200, whereby the pneumatic pressure sensor 307 is protected against high pressure during the vulcanization of the tire.

Figure 5:
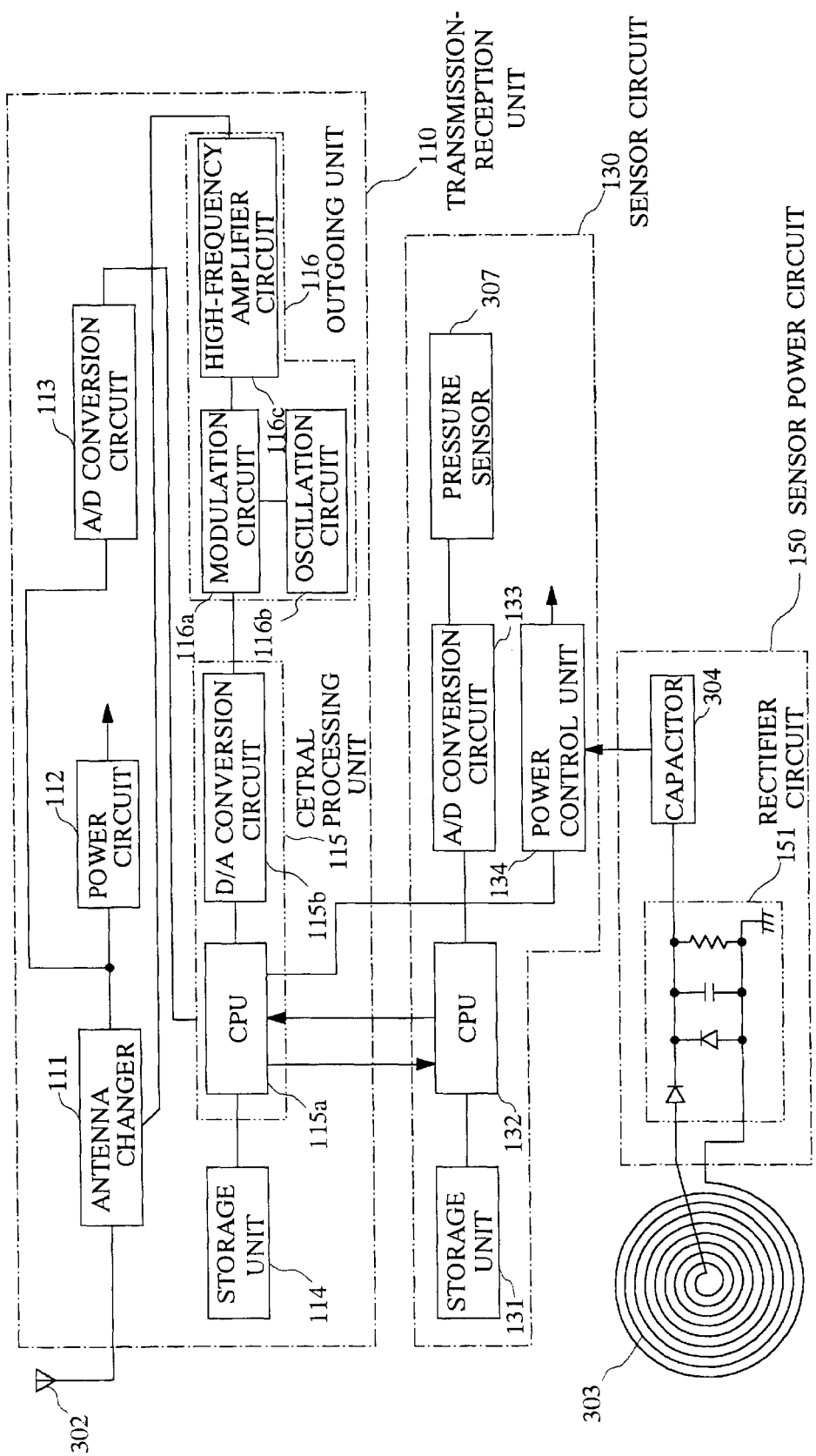
FIG. 5 is a block diagram showing a detailed configuration of the transponder according to the first embodiment of the present invention.

The block diagram of FIG. 5 shows a configuration of an electronic circuit for a transponder formed on the circuit substrate 301. In FIG. 5, reference numeral 110 denotes a data transmission-reception unit; 130, a sensor circuit; and 150, a sensor power circuit.

The data transmission-reception unit 110 is composed of: an antenna changer 111, a power circuit 112, an analog/digital (hereinafter, referred to as A/D) conversion circuit 113, a storage unit 114, a central processing unit 115 and an outgoing unit 116.

The antenna changer 111 is composed of, for example, an electronic switch or the like. The antenna changer 111 switches the data transmission-reception antenna 302 to either the power circuit 112 and the A/D conversion circuit 113 or the outgoing unit 116 in accordance with a control signal from the CPU115a for connection. Usually, the antenna 302 is connected to the power circuit 112 side.

The power circuit 112 forms a well-known full-wave rectifying circuit. On the input side of this power circuit 112, the antenna 302 is connected through the antenna changer 111. The power circuit 112 rectifies high-frequency current induced in the antenna 302 to convert into DC current, and outputs this as a driving power source for other circuits such as the central processing unit 115, the storage unit 114 and the outgoing unit 116.

The A/D conversion circuit 113 detects a question signal received, and converts the signal detected into digital data to output to the CPU115a.

The storage unit 114 includes an electrically rewritable non-volatile semiconductor memory such as, for example, EEPROM (Electrically Erasable Programmable Read-Only Memory), ROM and RAM in which a program of the CPU115a has been stored, or the like. In the EEPROM of the storage unit 114, identification information peculiar to individual transponders 100, additional information or the like have been stored in advance. The additional information is history information concerning the tire, for example, information such as the date of manufacture, the place of manufacture and the manufacture serial lot number. In this respect, the above described identification information is stored in a area within the EEPROM which has been designated as a non-rewritable area during the manufacture of the transponder 100. The identification information may be also stored in the ROM.

The central processing unit 115 is composed of the well-known CPU115a and the D/A conversion circuit 115b. When power is provided, the CPU115a is driven and inputs a question signal from the A/D conversion circuit 113, the CPU115a drives the sensor circuit 130 to take in detection result on the pneumatic pressure. Further, the CPU115a generates answering information including this detection result on the pneumatic pressure and identification information peculiar to itself, and transmits this information as an answering signal through the D/A conversion circuit 115b and the outgoing unit 116. Also, when the detection result cannot be taken in because of the failure of the sensor circuit 130 to operate, the CPU115a regards the electric power accumulated in the sensor power circuit 150 as exhausted to transmit an answering signal including a request for charging. Further, when it is requested by the question signal to read out the additional information, the CPU115a includes the additional information stored in the storage unit 114 into the answering signal for transmitting. Also, when a renewal instruction for the additional information is included in the above described question signal, the CPU115a renews the additional information stored in the storage unit 114.

The outgoing unit 116 is composed of: a modulation circuit 116a; an oscillation circuit 116b; and a high-frequency amplifier circuit 116c. The outgoing unit 116 modulates a carrier wave obtained by oscillating through the use of the oscillation circuit 116b on the basis of the information signal inputted from the central processing unit 115 by the modulation circuit 116a, and supplies this modulated signal to the antenna 302 through the high-frequency amplifier circuit 116c and the antenna changer 111. In the present embodiment, as the frequency of a high-frequency signal to be outputted from the outgoing unit 116, a frequency of 13.56 MHz is used so as to obtain, for example, necessary and sufficient data transfer speed. For this reason, the data transmission-reception antenna 302 has been set so as to produce resonance at a frequency of 13.56 MHz. In order to obtain necessary and sufficient data transfer speed, it is preferable to set a frequency of electromagnetic wave for data transmission and reception to a frequency above the short wave region.

The sensor circuit 130 is composed of: a storage unit 131; a CPU132; an A/D conversion circuit 133; a power control unit 134; and a pneumatic sensor 307.

Communication is performed between the CPU132 and the CPU115a of the transmission-reception unit 110, and on receipt of a request for temperature and pressure information from the CPU115a, the CPU132 acquires the pneumatic information that the pneumatic sensor 307 has obtained by detecting through the A/D conversion circuit 133 to transmit to the CPU115a.

A power control unit 134 is composed of an electronic switch, a booster type power circuit or the like, turns ON or OFF the electronic switch on the basis of a control signal from the CPU115a of the data transmission-reception unit 110, converts electric power to be outputted from the sensor power circuit 150 into voltage required to operate the circuit, and supplies to the storage unit 131, the CPU132, the A/D conversion circuit 133, and the pneumatic pressure sensor 307.

The sensor power circuit 150 is composed of a rectifier circuit 151 and a capacitor 304. The input side of the rectifier circuit 151 is connected to a charging antenna 303. Also, the output side of the rectifier circuit 151 is connected to the capacitor 304 and the power control unit 134. The capacitor 304 is composed of, for example, a large scale capacitor or a secondary battery.

The capacitor 304 has capacity sufficient to drive the sensor circuit 130 five times a day. For example, in the case of driving the pneumatic pressure sensor 307, the power consumption of which is 6 mA and the power supply voltage of which is 3V, assuming that the pneumatic pressure is detected five times (before the commencement of work, morning recess, lunch break, afternoon recess and closing time) during daily operating time, a commercial secondary battery having a rating of 3.3V and capacity of about 0.1 mAh can be sufficiently used if it is charged. More specifically, assuming sensor driving time in one operation to be 1 second, the electric energy necessary for a daily operation amounts to 6 mA×3V×5 seconds/3600=0.025 mWh. Assuming the transmission efficiency from the sensor power source 150 to the sensor circuit 130 (due to the pump-up, leakage current or the like) to be 30%, 0.025/0.3= 0.083 mWh is given. Therefore, the commercial secondary battery having a rating of 3.3V and capacity of about 0.1 mAh can be sufficiently used if it is charged. In the case where this secondary battery is charged for, for example, six hours of the non-operating time, assuming the output voltage of the rectifier circuit 151 to be 3.3V and the charging efficiency of the charging current to be 65%, 0.083/3.3/6/

0.65=0.0064 mA is given. Accordingly, charging can be performed with the current that will not adversely affect the secondary battery.

Also, the charging antenna 303 has been set so as to produce resonance at a frequency of 125 kHz, and the energy transmission efficiency has been improved through the use of a comparatively low frequency.

Therefore, the electromagnetic wave of frequency of 125 kHz is radiated to the transponder 100 from the outside, whereby the capacitor 304 can be easily charged. Also, when a secondary battery is used as the storage battery 304, the transponder 100 can also be embedded in the tire because it is not necessary to replace the battery.

In this respect, for higher harmonic of the frequency of charging electromagnetic wave, a frequency that does not coincide with the frequency to be used for the data communication described above is preferably used. In other words, when the frequency for data communication coincides with the higher harmonic of charging frequency, the data communication may be disturbed. Therefore, if relationship between the frequency for data communication and the charging frequency is set such that the frequency for data communication does not coincide with the higher harmonic of charging frequency, the data communication will be able to be favorably performed even when the charging electromagnetic wave is being radiated.

Further, by charging through the use of an electromagnetic wave of low frequency, it is possible to improve the energy transmission efficiency and to shorten time required to transmit the energy. Therefore, for the frequency of electromagnetic wave to be used for charging, a frequency below the medium wave region is preferable, and further when energy transmission by electromagnetic coupling is taken into consideration, it is preferable to use a frequency below 200 kHz.

Figure 6:
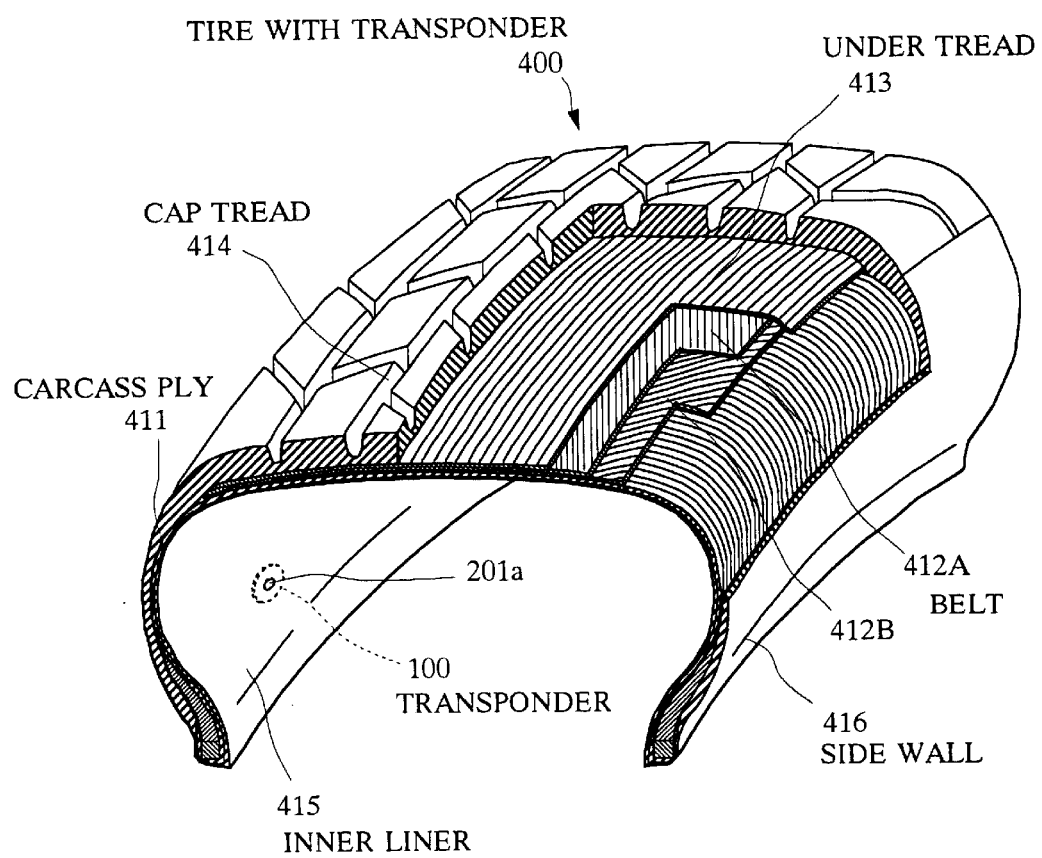
FIG. 6 is an exploded perspective view showing an essential portion of a tire with transponder according to the first embodiment of the present invention.
Figure 7:
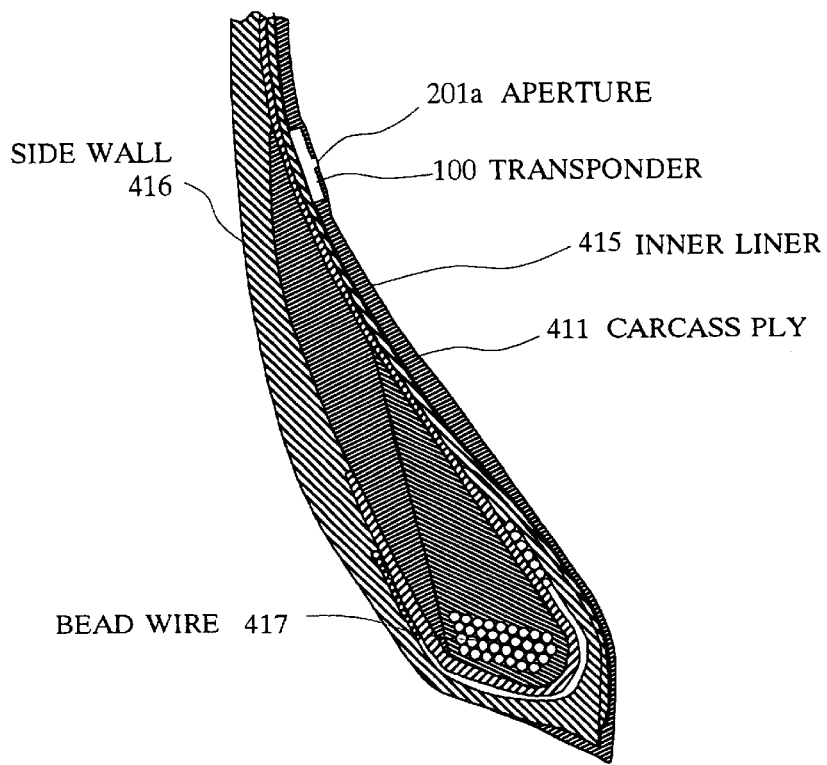
FIG. 7 is a sectional view showing an essential portion of the tire with transponder according to the first embodiment of the present invention.

The above described transponder 100 is, like the tire with transponder (hereinafter, simply referred to as tire) 400 shown in FIGS. 6 and 7, embedded in the tire inner side wall in such a manner that the surface of the circuit substrate 301 becomes substantially perpendicular. The tire 400 used in the present embodiment is a well-known tubeless radial tire, and in the drawings, reference numeral 411 denotes a carcass ply; 412A, 412B, a belt; 413, an under tread; 414, a cap tread; 415, an inner liner; 416, a side wall; and 417, bead wire.

Figure 8:
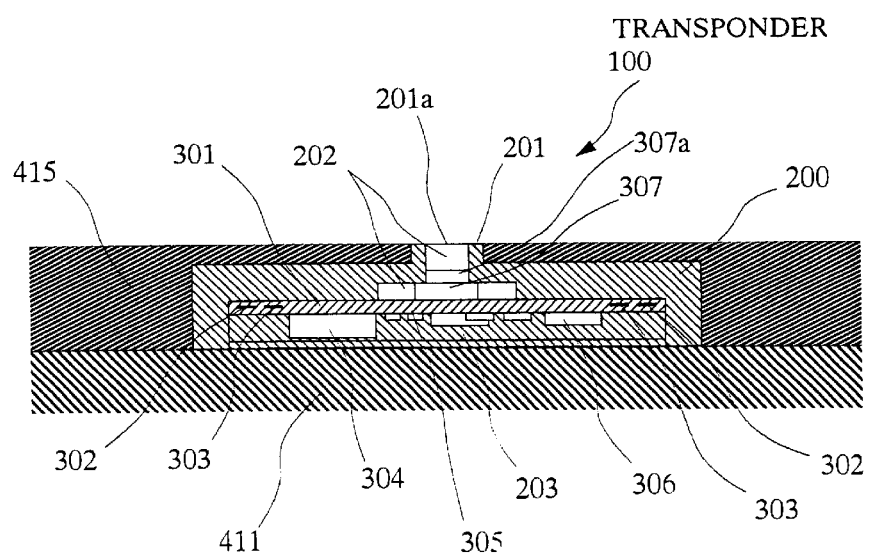
FIG. 8 is an enlarged sectional view showing an essential portion of the tire with transponder according to the first embodiment of the present invention.

In the present embodiment, between the inner liner 415 which is the innermost inner wall layer of the tire 400 and the carcass ply 411 which is the second inner wall layer from the inside, the transponder 100 has been embedded. At this time, as shown in FIG. 8, an aperture is formed in the inner liner 415, and from this aperture, an aperture 201a which has been formed at the tip end of an protruded portion 201 provided on the housing 200 of the transponder 100 is exposed. Thereby, when the tire 400 is actually mounted to a vehicle for use, the interior of the tire air chamber and space 202 within the housing 200 communicate with each other through the aperture 201a, and the pneumatic pressure sensor 307 is capable of directly sensing pneumatic pressure within the tire air chamber, and detecting accurate pneumatic pressure.

Figure 9A:
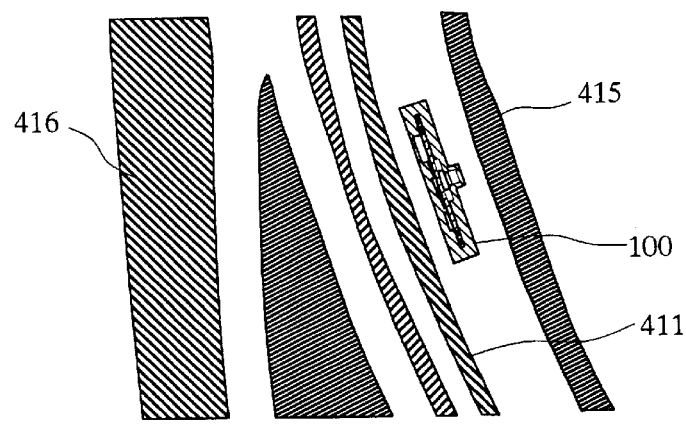
FIG. 9 is a view for explaining a method of manufacturing the tire with transponder according to the first embodiment of the present invention.

The aperture 201a of the housing 200 is formed by removing the tip end portion of the protruded portion 201 together with the inner liner 415 of the tire 400, the vulcanization of which has been completed. More specifically, as shown in FIG. 9, in a process (FIG. 9A) for manufacturing a green tire in the manufacturing process of the tire 400, at a position between the inner liner 415 and the carcass ply 411 which has been set in advance, a transponder 100 with no aperture 201a formed thereon is sandwiched, and members in each layer are stuck together to thereby manufacture the green tire. In this respect, the embedded position of the transponder 100 is determined in advance, whereby an operation for forming the aperture to be described later will be able to be easily performed.

Figure 9B:
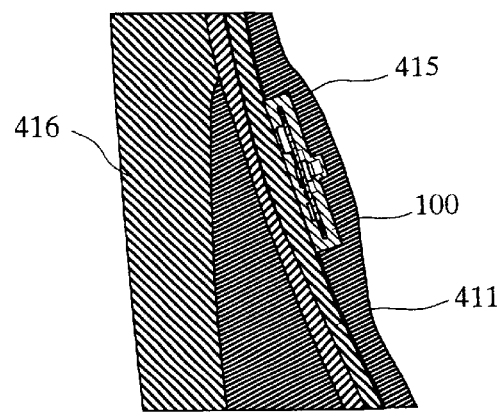
Figure 9C:
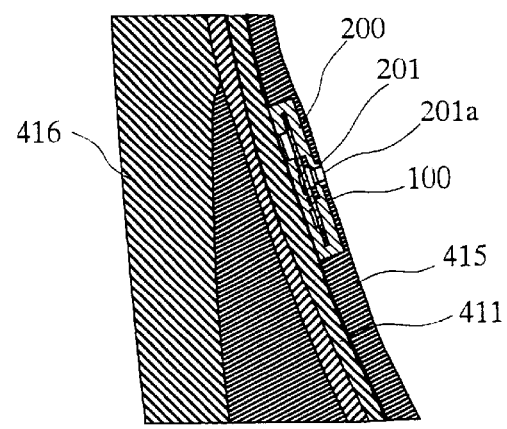

Thereafter, the green tire completed will be vulcanized (FIG. 9B). During the vulcanization, for example, pressure of 22 kg/cm$^2$ and heat of 150 degrees are applied to the green tire for about 45 minutes. After the termination of vulcanization, the inner liner 415 in an area where the transponder 100 has been embedded is gradually scraped off from the surface for removal (buffing). At this time, the tip end portion of the protruded portion 201 provided in the housing 200 of the transponder 100 is also scraped off to form the aperture 201a at the tip end of the protruded portion 201, and this aperture 201a is exposed within the tire air chamber (FIG. 9C).

In this respect, so as to be able to easily find out the embedded position of the transponder 100, a mark indicating the embedded position of the transponder 100 may be placed on the inner liner 415. Also, if it is an inner liner 415 having light permeability, the transponder 100 can be recognized by seeing the inner liner 415 through. As the material having light permeability suitable for the inner liner 415, for example, thermoplastic elastomer is known, and this can be used.

In the tire 400 thus completed, the transponder 100 is firmly fixed with stability because the transponder 100 has been embedded in the green tire before the vulcanization. Further, since when the transponder 100 is taken out of the tire 400 completed, there remain signs of having been taken out, it can be easily confirmed only by visual inspection that the transponder 100 has been replaced. Thus, the reliability of the information such as history of the tire stored in the storage unit 114 of the transponder 100 can be increased. Further, since the interior of the tire air chamber and the sensing unit 307a of the pneumatic pressure sensor 307 communicate with each other through the aperture 201a and the space 202, the pneumatic pressure sensor 307 is capable of directly sensing the pneumatic pressure within the tire air chamber, and detecting accurate pneumatic pressure.

Next, the description will be made of a second embodiment according to the present invention.

Figure 10:
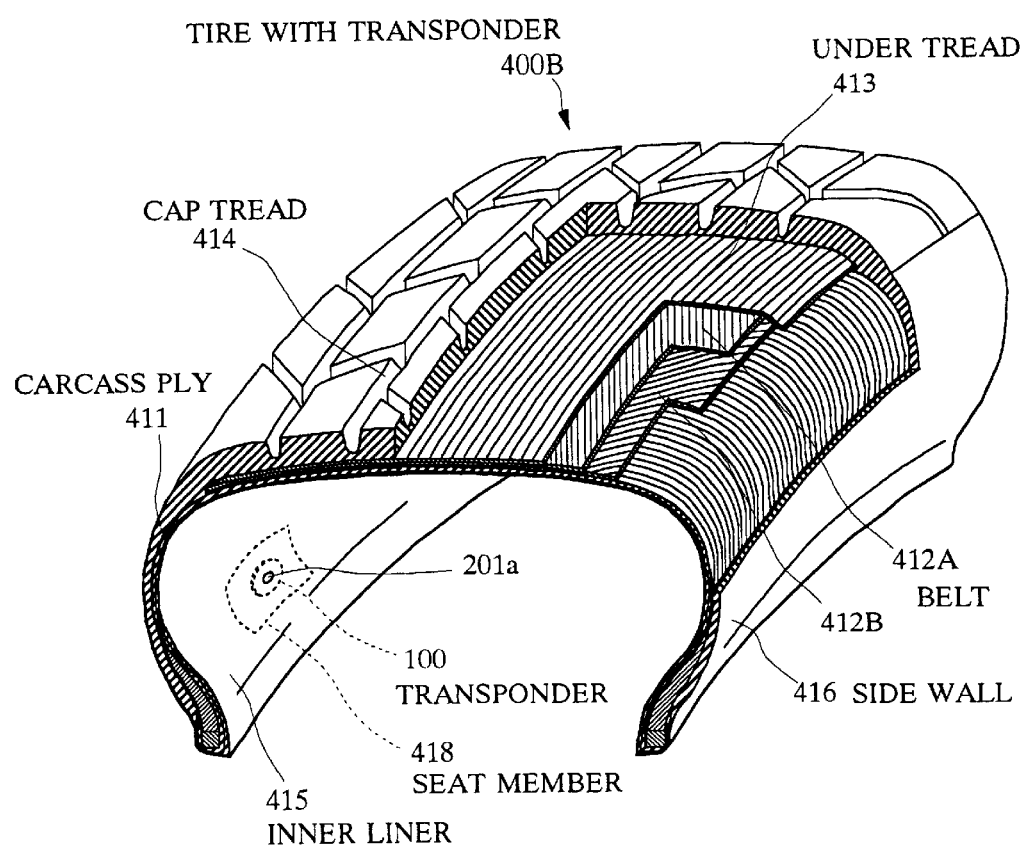
FIG. 10 is an exploded perspective view showing an essential portion of a tire with transponder according to a second embodiment of the present invention.
Figure 11:
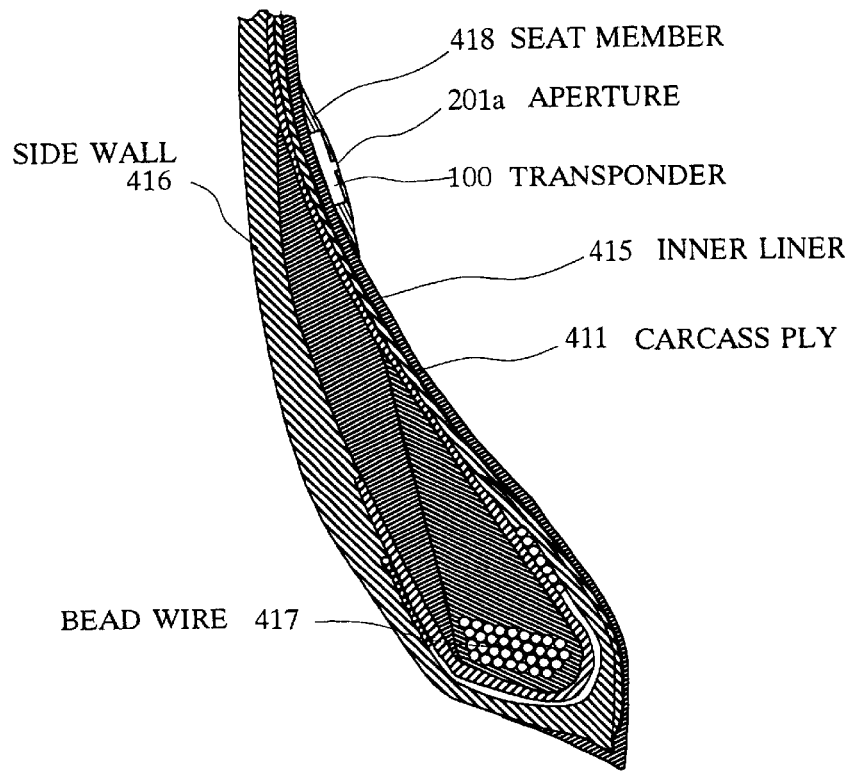
FIG. 11 is a sectional view showing an essential portion of the tire with transponder according to the second embodiment of the present invention.
Figure 12:
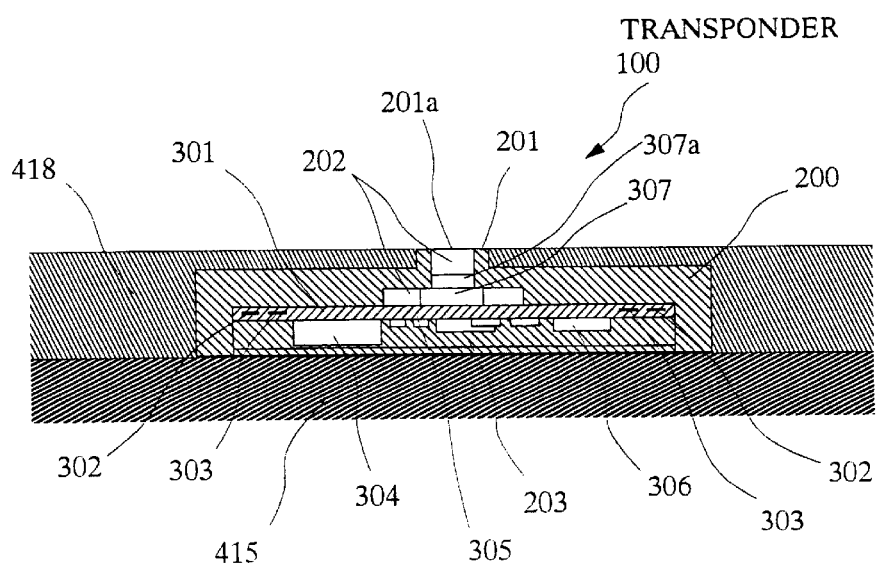
FIG. 12 is an enlarged sectional view showing an essential portion of the tire with transponder according to the second embodiment of the present invention.

FIG. 10 is a partially exploded perspective view showing an essential portion of a tire with transponder (hereinafter, simply referred to as tire) 400B according to the second embodiment, FIG. 11 is its essential sectional view, FIG. 12 is its essential enlarged sectional view, and FIG. 13 is a view for explaining a method of manufacturing the tire. In the drawings, components identical to those in the above described first embodiment are designated by the identical reference numerals and description thereof will be omitted.

In the second embodiment, the transponder 100 is mounted onto the surface inside the tire air chamber of the inner liner 415 of the tire 400B, and the top portion thereof is covered with a seat member 418. The seat member 418 is formed with an aperture, and from this aperture, an aperture 201a formed at the tip end of a protruded portion 201 provided on the housing 200 of the transponder 100 is exposed in the same manner as the first embodiment. Thereby, when the tire 400B is actually mounted to a vehicle for use, the interior of the tire air chamber and space 202 within the housing 200 communicate with each other through the aperture 201a, and the pneumatic pressure sensor 307 is capable of directly sensing the pneumatic pressure within the tire air chamber, and detecting accurate pneumatic pressure.

In the manufacture of the tire 400B, when the green tire is formed, a transponder 100 with no aperture 201a formed thereon is stuck onto an inner liner 415 through the use of a seat member 418, and in this state, the green tire mounted with the transponder 100 is vulcanized. Further, the tip end portion of the protruded portion 201 is removed together with the seat member 418 of the tire 400B, the vulcanization of which has been completed, whereby the aperture 201a of the housing 200 is formed.

Figure 13A:
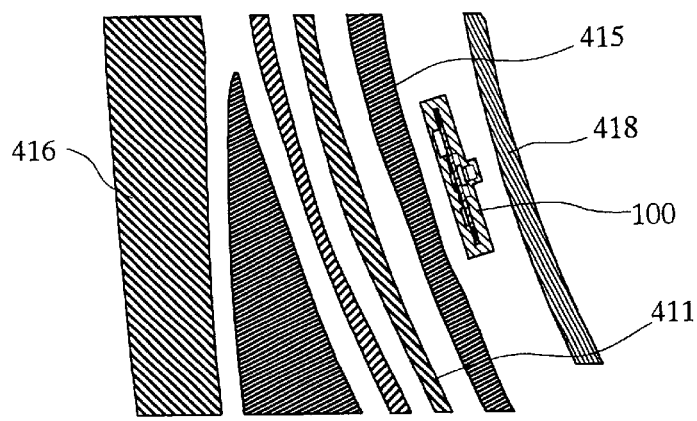
FIG. 13 is a view for explaining a method of manufacturing a tire with a transponder according to the second embodiment of the present invention.
Figure 13B:
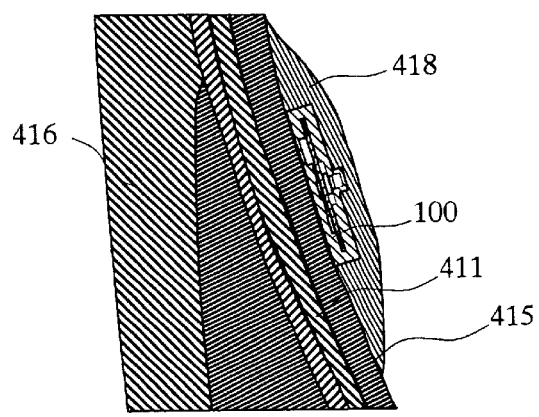
Figure 13C:
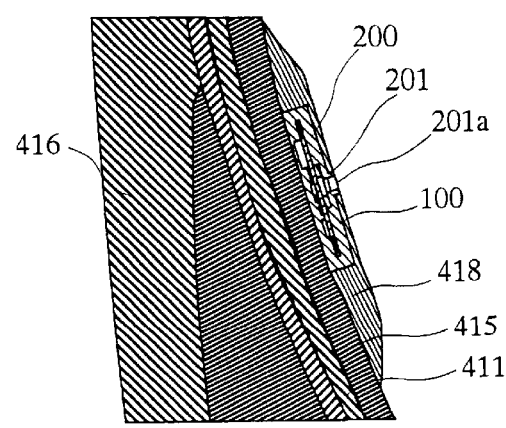

That is, as shown in FIG. 13, in a process (FIG. 13A) for manufacturing a green tire in the manufacturing process of the tire 400B, at a preset position of the inner liner 415, a transponder 100 is sandwiched between the inner liner 415 and the seat member 418 so as to cover the transponder 100 with the seat member 418, and members in each layer are stuck together. In this case, in the same manner as the first embodiment, the housing 200 is arranged in such a manner that the protruded portion 201 is positioned inside the tire air chamber. Also, the embedded position of the transponder 100 is determined in advance, whereby an operation for forming the aperture 201a will be able to be easily performed. Thereafter, the green tire completed will be vulcanized (FIG. 13B). Thereby, the seat member 418 and the inner liner 415 are substantially integrated. After the termination of vulcanization, the seat member 418 which covers the transponder 100 is gradually scraped off from the surface for removal (buffing). At this time, the tip end portion of the protruded portion 201 provided in the housing 200 of the transponder 100 is also scraped off together to form the aperture 201a at the tip end of the protruded portion 201, and this aperture 201a is exposed within the tire air chamber (FIG. 13C).

In this respect, so as to be able to easily find out the embedded position of the transponder 100, a mark indicating the embedded position of the transponder 100 may be placed on the seat member 418, or a seat member 418 having color different from that of the inner liner 415 may be used. Also, if a seat member 418 having light permeability is used, the transponder 100 can be recognized by seeing the seat member 418 through. As the material for the seat member 418 having light permeability, for example, thermoplastic elastomer is known in the same manner as described above, and this can be used.

In the tire 400B thus completed, when the transponder 100 is taken out of the tire 400B after the vulcanization, there remain signs of having been taken out because the transponder 100 has been embedded in the green tire before the vulcanization. For this reason, it can be easily confirmed only by visual inspection that the transponder 100 has been replaced. Thus, the reliability of the information such as history of the tire stored in the storage unit 114 of the transponder 100 can be increased. Further, since the interior of the tire air chamber and the sensing unit 307a of the pneumatic pressure sensor 307 communicate with each other through the aperture 201a and the space 202, the pneumatic pressure sensor 307 is capable of directly sensing the pneumatic pressure within the tire air chamber, and detecting accurate pneumatic pressure.

As described in the foregoing, in the transponder for tire according to the present invention, since the sensor and the transmission-reception unit 110 (wireless communication means) are hermetically sealed and housed within the housing 200, the pressure during the vulcanization is interrupted by the housing 200 even if vulcanized in a state in which the transponder has been embedded in the green tire. For this reason, there is no possibility that the pressure during the vulcanization is applied to the sensor and the wireless communication means. Thus, the sensor and the wireless communication means are protected against deterioration and destruction due to the pressure during the vulcanization. Also, after the termination of vulcanization, a portion targeted for removal is removed from the inner wall side of the tire together with the tire inner wall by machining, cutting or the like, whereby a physical quantity sensing unit of the sensor and the interior of the tire air chamber can communicate with each other, and therefore, the physical quantity in the atmosphere within the tire air chamber can be accurately sensed by the physical quantity sensing unit of the sensor.

Also, in the tire with transponder according to the present invention, since the housing for transponder is embedded in the tire inner wall, when the transponder is taken out of the tire, there remain signs of having been taken out. For this reason, it can be easily confirmed only by visual inspection that the transponder has been replaced. Thus, when the information such as history of the tire has been stored in the transponder, the reliability thereof can be increased. Further, since the interior of the tire air chamber and the physical quantity sensing unit of the sensor communicate with each other through the aperture 201a of the housing 200, the sensor is capable of directly sensing the physical quantity in the atmosphere within the tire air chamber, and detecting accurate physical quantity.

Also, since the transponder housing has been embedded in a green tire before vulcanization in accordance with the manufacturing method for the tire with transponder according to the present invention, it becomes impossible to take the transponder out of the completed tire after the vulcanization leaving no traces.

In this respect, each embodiment described above is an embodiment according to the present invention, and the present invention is not limited only thereto. For example, in the above described embodiment, the housing 200 for the transponder 100 has been provided with the protruded portion 201 and the tip end portion of the protruded portion 201 has been regarded as the portion targeted for removal, but with any other portion of the housing than the protruded portion as a portion targeted for removal, the sensing unit 307a of the pneumatic pressure sensor 307 and the interior of the tire air chamber may be caused to communicate with each other.

Also, in the above described embodiments, as a sensor for detecting physical quantity in the atmosphere within the tire air chamber, there has been provided only the pneumatic pressure sensor 307, but a sensor for detecting other physical quantity, for example, physical quantity such as temperature and humidity may be provided, and plural types of sensors may be provided.

Also, in the above described embodiments, as the pneumatic pressure sensor 307, the semiconductor piezoresistance type diaphragm has been used, but any other type of pneumatic pressure sensors than this sensor may be used.

Also, in the above described embodiments, there has been used the transponder 100 which performs wireless communication through the use of an electromagnetic wave, but there may be used a transponder which performs wireless communication through the use of any other communication means than the electromagnetic wave, for example, supersonic.

Also, in the above described embodiments, the transponder 100 has been provided with the capacitor 304, but a transponder having no capacitor 304 may be used, and in place of the capacitor 304, a transponder equipped with a generator may be used.

Also, in the above described embodiments, for the tire 400, 400B, the tubeless radial tire has been used, but it goes without saying that even any other type tires can have similar effects.

The present invention can be implemented in other various forms without departing from the spirit or major features of the invention. Therefore, the above described embodiments are only mere illustrations in every respects, and should not be interpreted limitatively. The scope of the present invention is shown by claims, and is not restricted by the text of the specification. Further, alterations and modifications belonging to the range of equivalency of claims are all within the scope of the present invention.

What is claimed is:

1. A transponder for tire, having a sensor for detecting physical quantity in an atmosphere within a tire air chamber to convert into an electric signal and wireless communication means, said wireless communication means performing communication with a main device, and transmitting, on receipt of a predetermined question signal from said main device, an answering signal including detection result of said physical quantity to said main device, wherein there is provided a housing for hermetically sealing and housing said sensor and said wireless communication means in a hermetically sealed state, and said housing to maintain said sensor and wireless communication means in the hermetically sealed state and has space defined partially by said housing and partially by a hollow protruded portion, at least a section of the hollow protruded portion being removed from the housing to provide an unsealed state so that the space enables communication between a physical quantity sensing unit of said sensor inside said housing and the atmosphere inside the tire air chamber.

2. The transponder for tire according to claim 1, wherein said wireless communication means is isolated from said space.

3. The transponder for tire according to claim 1, wherein said wireless communication means performs communication through the use of an electromagnetic wave.

4. The transponder for tire according to claim 1, further comprising a pneumatic pressure sensor as said sensor.

5. The transponder for tire according to claim 4, further comprising a semiconductor piezo-resistance type diaphragm as said pneumatic pressure sensor.

6. The transponder for tire according to claim 1, wherein said housing is made of bisphenol A epoxy resin.

7. The transponder for tire according to claim 1, wherein said transponder has storage means in which identification information peculiar to individual transponders is stored, and said wireless communication means transmits said answering signal including said identification information.

8. The transponder for tire according to claim 1, wherein said transponder has storage means in which identification information peculiar to individual transponders and additional information are stored, and said wireless communication means transmits said answering signal including said identification information and said additional information.

9. The transponder for tire according to claim 8, wherein said additional information is history information of said tire.

10. The transponder for tire according to claim 8, further comprising information renewal means for renewing additional information stored in said storage means on the basis of a signal received from said main device.

11. A tire with a transponder, equipped with a transponder having a sensor for detecting physical quantity in an atmosphere within a tire air chamber to convert into an electric signal and wireless communication means, said wireless communication means performing communication with a main device, and transmitting, on receipt of a predetermined question signal from said main device, an answering signal including detection result of said physical quantity to said main device, wherein said transponder has a housing for hermetically sealing and housing said sensor and said wireless communication means in a hermetically sealed state, and wherein said housing is embedded in the tire inner wall and wherein a hollow protruded portion protrudes from the main body of said housing, is at least partially embedded in the tire inner wall and is operative to maintain said sensor and said wireless communication means in the hermetically sealed state, said hollow protruded portion and said housing providing a space defined partially by said housing and partially by said hollow protruded portion, at least a section of the hollow protruded portion being removed from the main body of said housing to form an aperture resulting in the hermetically sealed state changing into an unsealed state so that the space enables communication between the physical quantity sensing unit of said sensor and the atmosphere within the tire air chamber.

12. The tire with a transponder according to claim 11, wherein said wireless communication means is isolated from said space.

13. The tire with a transponder according to claim 11, further comprising a pneumatic pressure sensor as said sensor.

14. The tire with a transponder according to claim 11, wherein said transponder housing is embedded between a tire inner liner and a carcass ply.

15. The tire with a transponder according to claim 14, wherein said tire inner liner is made of a member having light permeability.

16. The tire with a transponder according to claim 15, wherein said tire inner liner having said light permeability is made of thermoplastic elastomer.

17. The tire with a transponder according to claim 11, wherein said transponder housing is embedded between a seat member stuck onto a tire inner liner and vulcanized together with said tire inner liner and said tire inner liner.

18. The tire with a transponder according to claim 17, wherein said seat member is made of a member having light permeability.

19. The tire with a transponder according to claim 18, wherein said seat member having said light permeability is made of thermoplastic elastomer.

20. The tire with a transponder according to claim 17, wherein said seat member is made of a member having color different from that of said tire inner liner.

21. The tire with a transponder according to claim 11,
wherein said wireless communication means performs communication through the use of an electromagnetic wave.

22. The tire with a transponder according to claim 11,
wherein said transponder has storage means in which identification information peculiar to individual tires is stored, and said wireless communication means transmits said answering signal including said identification information.

23. The tire with a transponder according to claim 11,
wherein said transponder has storage means in which identification information peculiar to individual tires and additional information are stored, and said wireless communication means transmits said answering signal including said identification information and paid additional information.

24. The tire with a transponder according to claim 23,
wherein said transponder has information renewal means for renewing additional information stored in said storage means on the basis of a signal received from said main device.

25. A manufacturing method of a tire with transponder equipped with a transponder having a sensor for detecting physical quantity in an atmosphere within a tire air chamber to convert into an electric signal and wireless communication means, said wireless communication means performing communication with a main device, and transmitting, on receipt of a predetermined question signal from said main device, an answering signal including detection result of said physical quantity to said main device, comprising the steps of:

through the use of said transponder provided with a housing for hermetically sealing and housing said sensor and said wireless communication means in a hermetically sealed state, having a hollow protruded portion integrally formed with and projecting from said housing to maintain said sensor and said wireless communication means in the hermetically sealed state and having space defined at least partially by said hollow protruded portion and said housing;

embedding said transponder in the inner wall of a green tire before vulcanization;

vulcanizing said green tire in which said transponder is embedded; and removing, after vulcanization, at least a section of said hollow protruded portion together with part of the inner wall surface of said tire causing the hermetically sealed state to change to an unsealed state so that the atmosphere within said tire air chamber communicates with physical quantity sensing unit of said sensor through the space in said housing.

26. The manufacturing method of a tire with transponder according to claim 25,
wherein in said step of embedding said transponder, said transponder housing is embedded between a tire inner liner and a carcass ply.

27. The manufacturing method of a tire with transponder according to claim 26,
wherein as said tire inner liner, a member having light permeability is used.

28. The manufacturing method of a tire with transponder according to claim 26,
wherein as said tire inner liner, thermoplastic elastomer having light permeability is used.

29. The manufacturing method of a tire with transponder according to claim 25,
wherein in said step of embedding said transponder, a seat member is stuck onto a tire inner liner so as to cover said transponder housing with said seat member to embed said transponder into the inner wall of said green tire.

30. The manufacturing method of a tire with transponder according to claim 29,
wherein as said peat member, a member having light permeability is used.

31. The manufacturing method of a tire with transponder according to claim 29,
wherein as said seat member, thermoplastic elastomer having light permeability is used.

32. The manufacturing method of a tire with transponder according to claim 29,
wherein as said seat member, a member having color different from that of said tire inner liner is used.

33. The manufacturing method of a tire with transponder according to claim 25,
wherein in said step of embedding said transponder, said transponder is embedded such that a portion targeted for removal is positioned inside said tire air chamber.

* * * * *